United States Patent [19]

Hartwigsen et al.

[11] Patent Number: 4,942,982

[45] Date of Patent: Jul. 24, 1990

[54] SILO CLEANING APPARATUS

[76] Inventors: Wesley D. Hartwigsen, Box 1461; Alan D. Johnson, 2616 Wind River Dr.; Jeffrey C. Beckham, 709 Granite St.; Kenneth L. White, 3233 Watsabaugh St., all of, Gilette, Wyo. 82716

[21] Appl. No.: 149,338

[22] Filed: Jan. 28, 1988

Related U.S. Application Data

[62] Division of Ser. No. 928,090, Nov. 7, 1986, Pat. No. 4,764,221.

[51] Int. Cl.5 .............................................. B65G 69/06

[52] U.S. Cl. .................................... 222/195; 222/196; 222/404; 241/195; 366/102

[58] Field of Search ............... 222/404, 195, 196, 406; 366/102, 124; 241/195; 134/8, 6, 22.1, 22.11, 22.12

[56] References Cited

U.S. PATENT DOCUMENTS

| | | | |
|---|---|---|---|
| 2,025,404 | 12/1935 | Stahn | 222/195 X |
| 2,622,047 | 3/1948 | Ayers | 134/7 |
| 3,578,216 | 5/1971 | Pearson | 222/195 |
| 3,942,689 | 3/1976 | Daken, Jr. et al. | 222/195 |
| 4,056,215 | 11/1977 | Zwahlen | 222/231 |
| 4,508,577 | 4/1985 | Conn et al. | 134/23 |
| 4,620,795 | 11/1986 | Diebold et al. | 222/228 X |
| 4,764,221 | 8/1988 | Hartwigsen et al. | 134/22.12 |

FOREIGN PATENT DOCUMENTS

| | | | |
|---|---|---|---|
| 957660 | 11/1974 | Canada | 222/195 |

*Primary Examiner*—Michael S. Huppert
*Assistant Examiner*—Gregory L. Huson

[57] ABSTRACT

A silo which is impeded by a mass of cohering particles is cleaned by the disclosed apparatus by extending at least one flexible tube connected to a mace into the silo to near the coherent mass and flowing gas through the tube and mace at a rate and pressure causing swinging and writhing movements by the mace and tube.

9 Claims, 2 Drawing Sheets

SILO CLEANING APPARATUS

RELATED APPLICATION

This is a division of application Ser. No. 928,090, filed Nov. 7, 1986 now issued as U.S. Pat. No. 4,764,221.

BACKGROUND OF THE INVENTION

This invention relates to cleaning silos for storing particulate materials where the storing and delivering capacity of the silo is impeded by cohesive masses of the particles within the silo.

In general, silos are typified by coal silos and coal silos are described in the publication AF-791 "Coal Preparation for Combustion and Conversion" (prepared for Electric Power Research Company, May 1978) as follows:

"Coal storage silos are constructed of either steel or concrete although, in the large sizes, steel structures have not proven as economical as concrete. Small concrete silos are built up of precast staves banded together with wire hoops; large silos are constructed of continuously poured concrete using the slipdown technique.

The dimensions of concrete silos have responded to demands for larger capacities and to developments in the state of the art in construction techniques. Silo heights of two to three times the silo diameter are generally found most economical. Capacity of a 70 ft silo, depending on its height, is 10,000 to 15,000 tons. Its installed cost ranges from $100 to $200/ton of storage capacity, . . . Early designs of concrete silos provided rather simple coal drawdown methods. A system of seven gates works well enough with most clean coals, except for occasional rat-holing, i.e., a narrow withdrawal funnel down through the center line of each gate. At other times, coals may bridge over the gate openings, causing flow to become erratic or to halt completely. Preferred designs incorporate the mass or plug flow principle through the use of multiple hoppers having sides sloping upwards at up to 70 degrees, with inlet openings up to 18 ft in diameter and outlet openings as large as practical or rectangular."

SUMMARY OF THE INVENTION

The present invention relates to cleaning a silo in which particular solids have formed cohesive masses. At least one flexible hose is connected to a mace. The mace body is arranged to have a density exceeding that of the material in the silo. The peripheral surfaces of the mace are preferably composed of spark-resistant material where the solid particles or dust in the silo may be or become explosive. The hose connected to the mace is extended downward from an upper portion of the silo so that the mace is supported by the hose at a depth at least near that of a cohesive mass of the silo contents. A gas which is relatively inert to the material in the silo is pumped through the hose at a pressure and rate such that the mace is pneumatically driven into a swinging and writhing motion that moves it into and out of contact with cohesive masses encountered along a segment of the interior of the silo. At least one such mace is disposed and operated in positions such that substantially all of the cohesive masses within the silo are disrupted into masses of relatively free-flowing particles.

DESCRIPTION OF THE INVENTION

Applicants discovered that a process of cleaning a silo with a gas powered mace can be highly effective if—but only if—the components and functions of the mace and the powering of it are tailored to the properties of the materials being treated. Maces, mace supporting hoses and mace powering gas flows, of different sizes and configurations have been tested in the cleaning of coal silos. In the cleaning of a 13,000-ton coal silo containing a typical accumulation of cohesive masses of coal which impeded its operation, the application of a series of pneumatically powered "robots" (of proprietary design, which was kept secret) cleaned (i.e., freed-up and removed) coal at a rate of 16 tons in 24 hours (or about 0.67 tons per hour). In contrast, in cleaning a similarly impeded silo with two gas powered maces of the present invention, the coal was cleaned at a rate 1800 tons in 20 hours (or about 90 tons per hour).

Figure 1:
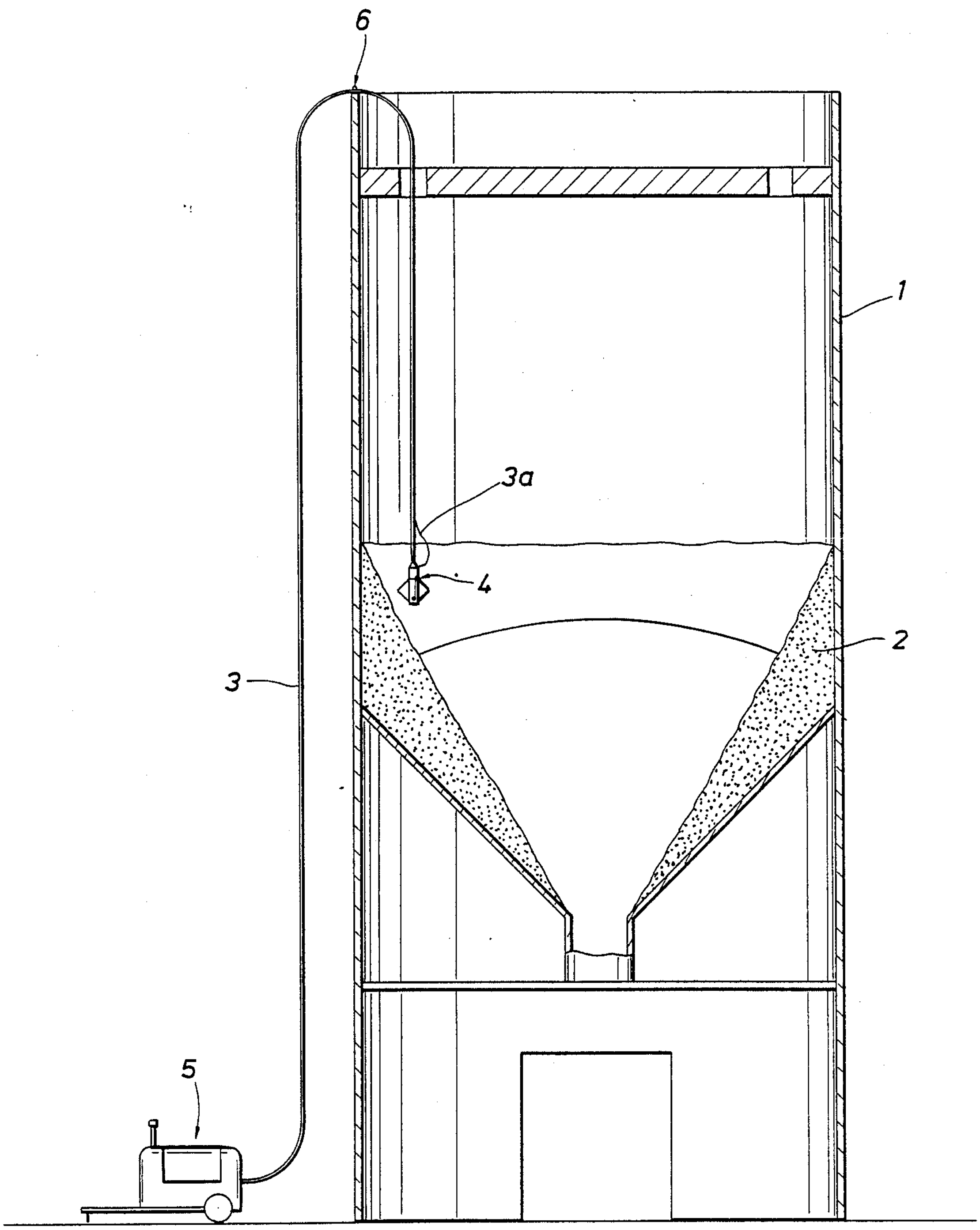
FIG. 1 is a schematic illustration of a silo containing a gas powered mace of the present invention.

FIG. 1 shows a coal silo 1 having a coal buildup 2 comprising a relatively cohesive mass of coal particles. A gas supply hose 3, such as a 1-inch heavy duty air hose, is connected between a mace 4 and a source of highly pressurized inert gas such as air compressor 5.

The hose 3 is extended downward from an upper portion of the silo and temporarily fastened near the top at a location such as point 6, so that the hose supports the mace at a depth at least near the coal buildup 2. A safety chain or cable **3*a*** is preferably attached between the hose and mace, in case the hose coupling should fail.

Figure 2:
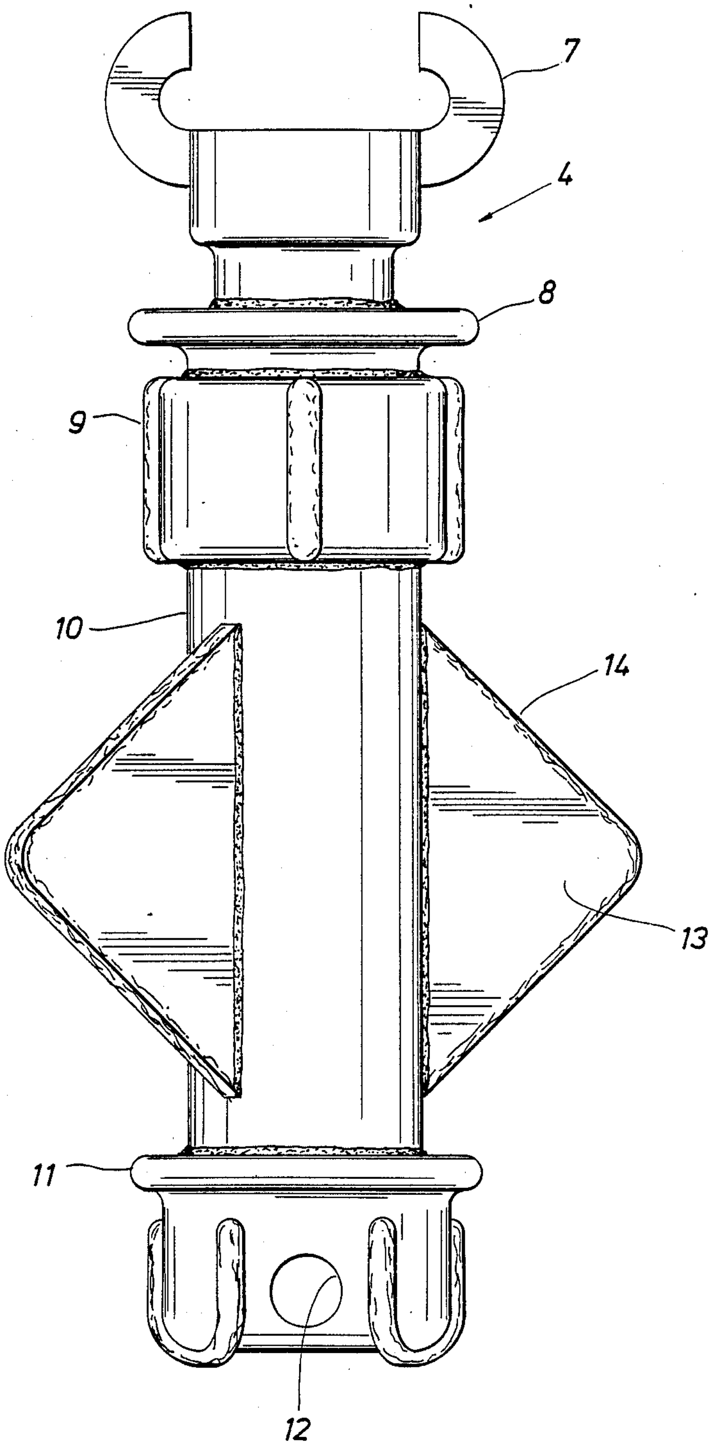
FIG. 2 is a schematic illustration of a particularly preferred embodiment of a mace of the present invention.

FIG. 2 illustrates the details of a particularly preferred embodiment of the present type of mace, which weighs about 5.5 pounds. A gas hose connection 7, such as a 1-inch Chicago pneumatic UM-75-M or equal Gladhand type air hose connection with safety pin is provided at the top of a tubular body. The hose connection 7 is attached, preferably by welds and threads, to a bushing 8 such as a 1½-inch by 1-inch National Pipethread bushing. The bushing 8 is similarly connected to a coupling 9, such as a 1½-inch National Pipethread coupling. The coupling 9 is similarly connected to a pipe nipple 10, such as a 1½-inch by 6-inch National Pipethread nipple. The pipe nipple 10 is similarly connected to a pipe cap 11, such as a 1½-inch National Pipethread cap.

Preferably, a single laterally disposed gas discharge port 12 is provided in the side of the pipe cap 11. The port or ports are preferably sized and arranged to provide a total flow equivalent to a flow of air through a 7/16-inch hole in a direction substantially perpendicular to the axis of the hose and mace.

The projections 13 of the mace 4 preferably comprise three triangular flat plates which are equally spaced with their longest sides aligned axially along the pipe nipple 10, such as 1¼×4×2½-inch AR grade iron plate, welded to the nipple 10. Each of the most exposed peripheral surfaces of the mace 4 are at least coated with a spark-resistant facing 14, such as a brass facing. The mace can be constructed entirely of brass, bronze or other spark-resistant material.

As will be apparent to those skilled in the art, different configurations of the mace and its projections (and, for treating coal or other potentially explosive materials, spark-resistant outer surfaces) can suitably be employed. The density of the mace with its interior filled with gas preferably exceeds the density of the material in the silo to be cleaned to an extent such that the mace tends to sink within at least a non-coherent mass of particles of that material. To further this, the projections on the mace should have outer surfaces which are preferably generally rounded to enhance such a penetration.

In general, the mace preferably comprises an elongated body containing a central gas conduit and a gas exhaust port directed perpendicularly to its long axis. At least two projections on the mace are preferably oriented so that the lateral force of gas exhausting through the port or ports is directed generally perpendicular to the planes of those projections. Preferably, this is accomplished by employing at least three substantially equally spaced projections with a single exhaust port between a pair of projections, so that substantially any lateral thrust of the mace body moves it generally perpendicular to the planes of at least two projections.

The following outlines a particularly preferred procedure for cleaning a coal silo in accordance with the present invention:

1. Rig up three high volume air compressors with 150 psi capability. Run three individual lines (high strength) to the top of the silo and down to the point of the highest material buildup near the edge of the silo.

2. Connect the mace on the end of each air line and hook up a safety catch bridal and duct tape the air connection.

3. Fasten the air hose to the silo railing to suspend the mace.

4. Turn on a conveyor system for removing material from the silo and start the air compressors.

5. Whenever one of the air lines stops jumping or the air escape becomes steady the mace is stuck or covered with coal. Pick up on the hose until it again starts to jump then lower back down.

6. When the mace starts hitting the concrete silo wall or steel liner lower the air hose. Move each of the units around the silo to the extent required to get fairly even removal of coal buildup.

7. Monitor the material being removed from the silo, for example, by means of a belt scale. This also gives an indication as to when a mace may need to be lowered or moved.

8. After a significant amount of material has been removed, an inspection door can be opened to give a better indication of where each mace should be placed. Use the inspection door to determine when all buildup has been removed.

Tests have indicated that such a procedure can be done on a 70 ft. silo with over 2000 tons of buildup in less than 20 hours without the use of water; and no mess or extra cleanup is generated.

Tested Alternatives

The effectiveness of the following arrangements were compared with the above-described preferred embodiment of the present invention for cleaning a coal silo.

Similarly shaped maces made with longer bodies, or made of thicker pipe, or having weights about one-half to two times greater than 5.5 pounds, were found to be much less efficient. A spinning arrangement of flail-like chains on a bearing-mounted body tended to stop spinning and cleaning about as soon as it contacted a coherent mass of coal. Operating a mace with about the above shape and weight, but with a pipe nipple connected above the mace resulted in relatively quickly breaking the pipe nipple.

Suitable Compositions and Procedures

In general, the present invention is applicable to cleaning substantially any silo which contains a particulate material having a tendency to form cohesive masses impeding the performance of the silo. Examples of such silos include those for storing mined out oil shale, sulfur, uranium ore, trona, etc.

The density and size of the mace should be correlated relative to the density of the material in the silo to be cleaned and the strength of the cohesion with which such particles are bound into a cohesive mass. Basically, the mace should be capable of readily penetrating into a non-cohesive mass of such particles.

The mace-supporting flexible hose and the pressure and rate of flow of gas through the hose should be correlated with the weight of the mace so that when the mace is immersed within a noncohesive mass of particles, the gas flow tends to be driven upward and out of the mass of particles and into swinging and writhing and jumping movements within the silo. A preferred arrangement for use in coal silos comprises a combination of a flexible air hose having an inner diameter of about 1 to 1.25 inches with air flowed through the hose at a pressure of about 90 to 120 psi, where the hose length is at least about 50 feet and the air is exhausted through an outlet opening of about $\frac{1}{4}$th to $\frac{3}{8}$ths-inch in diameter and a mace of the type shown in the drawing weighing about 3 to 8 pounds.

What is claimed is:

1. An apparatus for removing cohesive masses of particles adhering to the internal walls of a silo, comprising:

a mace;

means for suspending the mace from the top of the silo in a pendulous manner, and in a vertically adjustable manner to place the mace within striking range of the cohesive masses;

means for supplying pressurized gas to the mace for discharge from the mace; and at least one laterally disposed discharge port on the mace for propelling the mace with a lateral force by discharging the supplied pressurized gas in a direction substantially normal to the axis defined by the suspended mace, propelling the mace in a manner to randomly strike and break up the cohesive masses within the silo.

2. The apparatus of claim 1 wherein the mace has a spark resistant external surface.

3. The apparatus of claim 1 wherein substantially the entire body of the mace is constructed of brass.

4. The apparatus of claim 1 wherein said mace has at least three surface projections thereon.

5. An apparatus for removing cohesive masses of particles adhering to the internal walls of a silo, comprising a mace;

a hose for suspending the mace from the top of the silo in a pendulous manner, and in a vertically adjustable manner to place the mace within striking range of the cohesive masses;

a compressor, said compressor located outside of the silo, for supplying pressurized gas to the mace for discharge from the mace; and at least one laterally disposed discharge port on the mace for propelling the mace with a lateral force by discharging the supplied pressurized gas in a direction substantially normal to axis defined by the suspended mace, propelling the mace in a manner to randomly strike and break up the cohesive masses within the silo.

6. The apparatus of claim 5 wherein the mace has a spark resistant external surface.

7. The apparatus of claim 5 wherein substantially the entire body of the mace is constructed of brass.

8. The apparatus of claim 5 wherein said mace has at least three surface projections thereon.

9. The apparatus of claim 8 wherein at least two of the projections are positioned such that they are generally perpendicular to the lateral force of the discharging pressurized gas.

* * * * *